US011003608B2

(12) United States Patent
Hundal et al.

(10) Patent No.: US 11,003,608 B2
(45) Date of Patent: *May 11, 2021

(54) SYSTEMS FOR ENHANCING BOARDROOM TABLES TO INCLUDE USB TYPE-C POWER AND CONNECTIVITY FUNCTIONALITY

(71) Applicant: Icron Technologies Corporation, Burnaby (CA)

(72) Inventors: Sukhdeep Singh Hundal, Surrey (CA); Julian Lee, Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,625

(22) Filed: Feb. 3, 2020

(65) Prior Publication Data

US 2020/0174956 A1 Jun. 4, 2020

Related U.S. Application Data

(63) Continuation of application No. 16/040,268, filed on Jul. 19, 2018, now Pat. No. 10,552,356, which is a
(Continued)

(51) Int. Cl.
*G06F 13/42* (2006.01)
*G06F 13/38* (2006.01)
*G06F 13/40* (2006.01)

(52) U.S. Cl.
CPC ........ *G06F 13/385* (2013.01); *G06F 13/4022* (2013.01); *G06F 13/4282* (2013.01); *G06F 2213/4004* (2013.01)

(58) Field of Classification Search
CPC . G06F 13/385; G06F 13/4022; G06F 13/4282
(Continued)

(56) References Cited

U.S. PATENT DOCUMENTS 6,253,329 B1   6/2001   Kang
6,324,605 B1   11/2001  Rafferty et al.
(Continued)

FOREIGN PATENT DOCUMENTS

WO   2007/147114 A2   12/2007
WO   2015/081448 A1   6/2015

OTHER PUBLICATIONS

European Examination Report dated Jan. 31, 2020, issued in corresponding European Application No. EP 16836316.6, filed Aug. 15, 2016, 11 pages.
(Continued)

*Primary Examiner* — Paul R. Myers
(74) *Attorney, Agent, or Firm* — Christensen O'Connor Johnson Kindness PLLC

(57) ABSTRACT

Boardroom table systems are provided that include a plurality of USB Type-C receptacles that can provide power and/or data transfer functionality to one or more devices attached thereto. Power transferred by the boardroom table system may be managed by USB Power Delivery, and may come from a source of wall power, or from a device coupled to one of the USB Type-C receptacles. Data transferred by the boardroom table system may include USB data, Ethernet data, video data, and/or any other type of data transmittable via a USB Type-C receptacle. In some embodiments, boardroom table systems also include presentation devices. In such embodiments, a device coupled to a USB Type-C receptacle could both transmit or receive power, exchange data, and transmit video to the presentation device via the same USB Type-C receptacle of the boardroom table system, thus eliminating the need for multiple sockets and cables.

14 Claims, 8 Drawing Sheets

Related U.S. Application Data continuation of application No. 15/237,155, filed on Aug. 15, 2016, now Pat. No. 10,031,873.

(60) Provisional application No. 62/205,538, filed on Aug. 14, 2015.

(58) Field of Classification Search
USPC .......................................................... 710/313
See application file for complete search history.

(56) References Cited

U.S. PATENT DOCUMENTS

| | | | |
|---|---|---|---|
| 6,378,014 | B1 | 4/2002 | Shirley |
| 6,557,170 | B1 | 4/2003 | Wilder et al. |
| 7,046,234 | B2 | 5/2006 | Ozolins |
| 7,519,749 | B1 | 4/2009 | Sivertsen |
| 8,615,611 | B2 | 12/2013 | Hall |
| 10,031,873 | B2* | 7/2018 | Hundal ............... G06F 13/4282 |
| 10,552,356 | B2* | 2/2020 | Hundal ............... G06F 13/4282 |
| 2005/0125519 | A1 | 6/2005 | Yang et al. |
| 2005/0172039 | A1 | 8/2005 | Hsu |
| 2005/0216620 | A1 | 9/2005 | Sandulescu et al. |
| 2005/0273312 | A1 | 12/2005 | Sandulescu et al. |
| 2006/0215687 | A1 | 9/2006 | Lee et al. |
| 2007/0086173 | A1 | 4/2007 | Chang et al. |
| 2007/0152972 | A1 | 7/2007 | Zhang |
| 2007/0236481 | A1 | 10/2007 | Liu |
| 2007/0285394 | A1 | 12/2007 | Lee et al. |
| 2008/0005262 | A1* | 1/2008 | Wurzburg ........... G06F 13/4022 709/217 |
| 2008/0036741 | A1 | 2/2008 | Hsieh et al. |
| 2008/0040527 | A1 | 2/2008 | Filipov et al. |
| 2008/0126629 | A1 | 5/2008 | Huang |
| 2009/0083453 | A1 | 3/2009 | Hsueh et al. |
| 2009/0083458 | A1 | 3/2009 | Seki et al. |
| 2009/0198848 | A1 | 8/2009 | Chien |
| 2009/0210608 | A1 | 8/2009 | Chang et al. |
| 2010/0060571 | A1 | 3/2010 | Chen et al. |
| 2010/0064066 | A1 | 3/2010 | Ho |
| 2010/0228902 | A1 | 9/2010 | Chou et al. |
| 2011/0010473 | A1 | 1/2011 | Szolyga |
| 2011/0320676 | A1* | 12/2011 | Cheng ................. G06F 13/4022 710/316 |
| 2014/0019648 | A1 | 1/2014 | Huang |
| 2014/0109216 | A1 | 4/2014 | Iversen |
| 2014/0344494 | A1 | 11/2014 | Zeung et al. |
| 2015/0089092 | A1 | 3/2015 | Voto et al. |
| 2015/0195492 | A1 | 7/2015 | Leerentveld et al. |
| 2016/0112711 | A1 | 4/2016 | Hundal et al. |
| 2016/0188506 | A1 | 6/2016 | Wang et al. |
| 2016/0216750 | A1 | 7/2016 | Hundal et al. |
| 2016/0253282 | A1 | 9/2016 | Bowers et al. |

OTHER PUBLICATIONS

"DisplayPort v1.3, Feature Summary," presentation, VESA.org, Sep. 18, 2014, 14 pages.

International Search Report and Written Opinion dated Nov. 9, 2016, issued in corresponding International Application No. PCT/CA2016/050960, filed Aug. 15, 2016, 8 pages.

Scanlon, J., et al., "Universal Serial Bus Power Delivery Specification," Revision 2.0, V1.1, Dunstan, B., and R. Petrie (eds), May 7, 2015, 544 pages.

Smith, R., "VESA Releases DisplayPort 1.3 Standard: 50% More Bandwidth, New Features," Sep. 16, 2014, AnandTech, <http://www.anandtech.com/show/8533/vesa-releases-displayport-13-standard-50-more-bandwidth-new-features> [retrieved Dec. 21, 2015], 6 pages.

"Universal Serial Bus 3.1: Specification," Revision 1.0, Jul. 26, 2013, Hewlett-Packard Company, Intel Corporation, Microsoft Corporation, Renesas Corporation, ST-Ericsson, Texas Instruments, 631 pages.

"Universal Serial Bus Type-C Cable and Connector: Specification," Revision 1.1, Apr. 3, 2015, USB 3.0 Promoter Group, 180 pages.

"Universal Serial Bus: Specification," Revision 2.0, Apr. 27, 2000, Compaq, Hewlett-Packard, Intel, Lucent, Microsoft, NEC, Philips, 650 pages.

Extended European Search Report dated May 16, 2019, issued in corresponding European Application No. 16836316.6, filed Aug. 15, 2016, 9 pages.

"Universal Serial Bus Type-C Cable and Connector Specification, Revision 1.0," USB 3.0 Promotor Group: Hewlett-Packard Company, Intel Corporation, Microsoft Corporation, Renesas, STMicroelectronics, and Texas Instruments, Revision USB-IF, Aug. 11, 2014, <isb.org> [retrieved Nov. 21, 2018], 172 pages.

\* cited by examiner

US 11,003,608 B2

SYSTEMS FOR ENHANCING BOARDROOM TABLES TO INCLUDE USB TYPE-C POWER AND CONNECTIVITY FUNCTIONALITY

CROSS-REFERENCE TO RELATED APPLICATION

This application is a continuation of application Ser. No. 16/040,268, filed Jul. 19, 2018, which is a continuation of application Ser. No. 15/237,155, filed Aug. 15, 2016, now U.S. Pat. No. 10,031,873, issued Jul. 24, 2018, which claims the benefit of Provisional Application No. 62/205,538, filed Aug. 14, 2015, the entire disclosures of which are hereby incorporated by reference for all purposes.

BACKGROUND

Many varieties of tables exist that include technology features. Such tables, often called boardroom tables or conference tables, sometimes have integrated power systems that allow users sitting at the table to charge a device such as a laptop computer (or other device) by plugging it in to a socket in the table. These sockets allow devices to be charged at the table, instead of having to plug the devices into the wall. Boardroom tables sometimes also have video cables that allow a video output of a laptop computer to be connected to a presentation system such as a monitor, a projector, and/or the like.

While supplying power sockets to devices and allowing a single device to be connected to a presentation system are useful, current systems are limited in that only traditional power sockets (such as two-prong outlets and USB Type-A receptacles) are provided. What is desired are more flexible systems that provide not only power but also reconfigurable data communication via integrated receptacles of a boardroom table.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a table having an integrated communication and power system is provided. The system comprises a plurality of USB Type-C ports; a video interface; and a switching device. The switching device selectively couples one USB Type-C port of the plurality of USB Type-C ports to the video interface.

In some embodiments, communication and power system for integration with a table is provided. The system comprises a plurality of USB Type-C ports and an extension control device. Each USB Type-C port is associated with an extension device of a plurality of extension devices. An extension medium is coupled to the extension devices. The extension control device is configured to transmit an instruction to a first extension device of the plurality of extension devices to operate as an upstream facing port device (UFP device); transmit an instruction to a second extension device of the plurality of extension devices to operate as a downstream facing port device (DFP device); and transmit instructions to the first extension device and the second extension device to pair with each other, such that a device coupled to a first USB Type-C port associated with the first extension device can communicate with a device coupled to a second USB Type-C port associated with the second extension device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
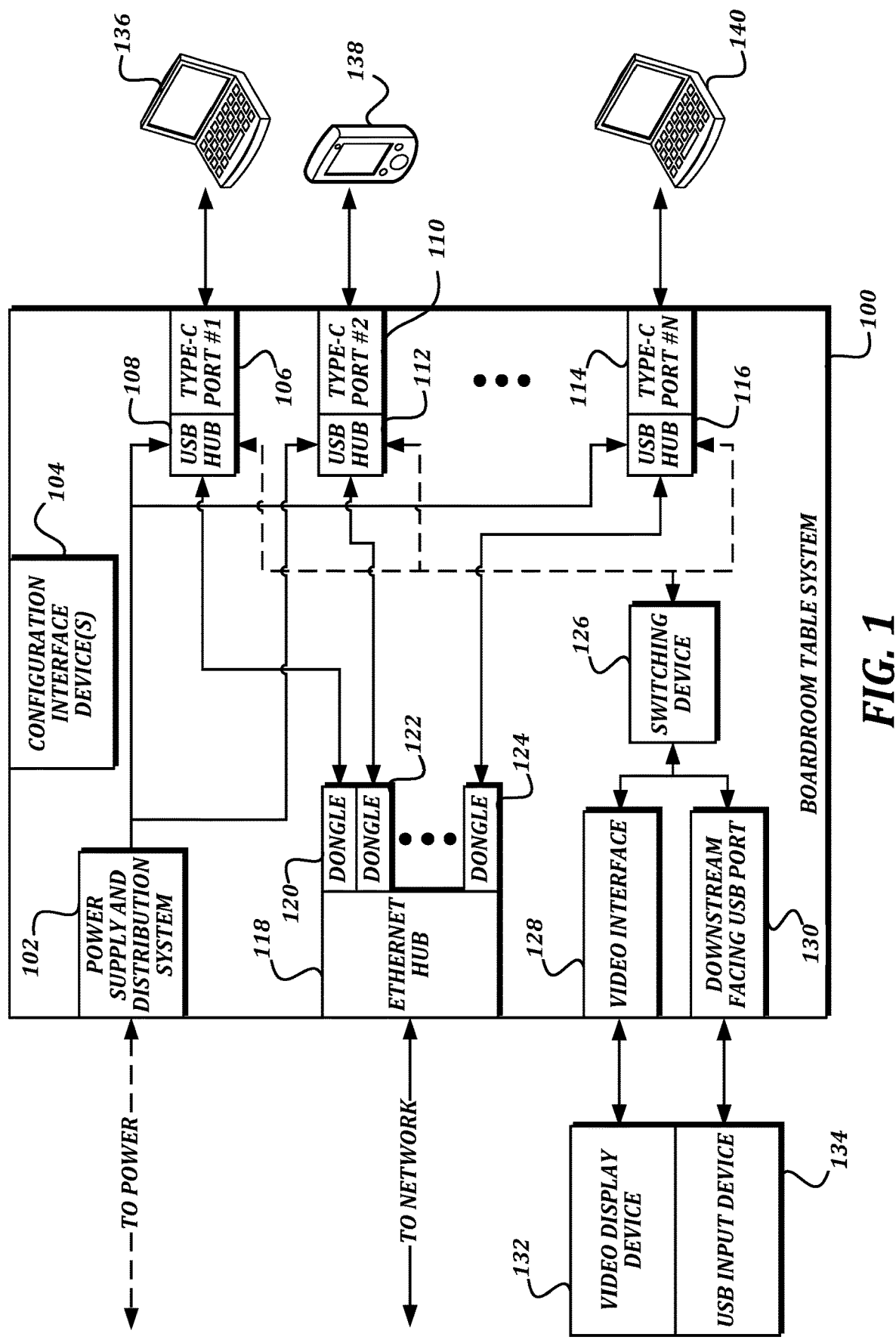
FIG. 1 is a block diagram that illustrates an exemplary embodiment of a boardroom table system according to various aspects of the present disclosure.

Standards have been published that describe a universal serial bus (USB) Type-C connector, plug, and cable that can support communication via USB 2.0, SuperSpeed, and DisplayPort via the same connector, including concurrent communication of at least some of these signals. USB 2.0 communication can include low-speed, full-speed, and high-speed communication, and is described in detail at least in "Universal Serial Bus Specification, Revision 2.0," released on Apr. 27, 2000 by Compaq et al. SuperSpeed communication includes normal SuperSpeed communication and Enhanced SuperSpeed communication. SuperSpeed communication is described in detail at least in "Universal Serial Bus 3.1 Specification, Revision 1.0," released on Jul. 26, 2013 by Hewlett-Packard Company et al. USB Type-C connectors, plugs, and cables are described in detail at least in "Universal Serial Bus Type-C Cable and Connector Specification, Revision 1.1," released on Apr. 3, 2015 by USB 3.0 Promoter Group. Power delivery over USB and the negotiation thereof is described in detail at least in "Universal Serial Bus Power Delivery Specification, Revision 2.0, Version 1.1," released on May 7, 2015 by Hewlett-Packard Company et al. DisplayPort communication is described in detail at least in "VESA DisplayPort Standard, Version 1.3," released on Sep. 15, 2015, by VESA. Communication of DisplayPort information over a USB Type-C interface is described in detail at least in the VESA DisplayPort Alt Mode Standard, Version 1, released on Sep. 22, 2014 by VESA. Each of these documents and their contents are known to one of ordinary skill in the art, and are hereby incorporated by reference herein along with any earlier versions or related documents mentioned therein in their entireties for all purposes.

In some embodiments of the present disclosure, boardroom table systems are provided that include a plurality of USB Type-C receptacles that can provide power and/or data transfer functionality to one or more devices attached thereto. Power transferred by the boardroom table system may include power from a wall wart or other wall power source, power from a battery, power from a USB Type-C device via USB Power Delivery, and/or from other sources as described below. Data transferred by the boardroom table system may include be USB data; Ethernet data; video data such as DisplayPort, DVI, HDMI, and/or VGA; and/or any other type of data transmittable via a USB Type-C receptacle.

In some embodiments, boardroom table systems also include presentation devices either attached to the boardroom table system or incorporated into the boardroom table system. In such embodiments, a device coupled to a USB Type-C receptacle could both transmit or receive power and transmit video to the presentation device via the same USB Type-C receptacle of the boardroom table system, thus eliminating the need for multiple sockets and cables. The device may even transmit other data such as USB data or network data over the same receptacle, further reducing the number of receptacles and cables needed. In some embodiments, the USB Type-C receptacles of the boardroom table system may be selectively coupled to the presentation device, so that it is not necessary to switch cables between devices to change presenters as is required by previous systems. In some embodiments, video and/or data protocol extension technology may be included with the boardroom table system, so that the boardroom table system may support large tables without suffering from data transfer distance limits imposed by the video or data transfer protocols. Further descriptions of various embodiments of the present disclosure are provided below.

FIG. 1 is a block diagram that illustrates an exemplary embodiment of a boardroom table system according to various aspects of the present disclosure. The boardroom table system 100 includes a plurality of USB Type-C receptacles, or "ports" 206, 210, 214, suitable for being connected to devices via compatible cables. In some embodiments, the ports 206, 210, 214 may be located on a central mounting hub, which may be configured in a protruding position to expose the ports 206, 210, 214, or in a retracted position to present a relatively smooth table surface. In some embodiments, the ports 206, 210, 214 may be located in one or more recesses within the table, and may be hidden by a hinged or otherwise openable cover. In some embodiments, the ports 206, 210, 214 may be positioned near a periphery of table or on the edge of the table.

In the embodiment illustrated in FIG. 1, the USB Type-C ports 106, 110, 114 are upstream facing ports of associated USB hubs 108, 112, 116, respectively. The USB hubs 108, 112, 116 each have at least three downstream facing ports. A first downstream facing port of each USB hub 108, 112, 116 is connected to a power supply and distribution system 102. A second downstream facing port of each USB hub 108, 112, 116 is connected to a network dongle 120, 122, 124, respectively. A third downstream facing port of each USB hub 108, 112, 116 is connected to a switching device 126. In some embodiments, each of these connections use USB-standard cables and connectors, for ease of implementation and seamless support.

In some embodiments, the switching device 126 may be any suitable circuitry to selectively couple one of the USB hubs 108, 112, 116 to a video interface 128 and a downstream facing USB port 130. Suitable circuitry may include but is not limited to an ASIC, a microcontroller, a physical switch, and/or the like. The video interface 128 may be another USB Type-C port, in which case the switching device 126 may simply make an electrical connection between the selected USB hub 108, 112, 116 and the video interface 128 and allow the USB Type-C functionality to negotiate a handshake to place the USB Type-C port in an appropriate alternate mode for transmitting video data to the video display device 132. In some embodiments, the video interface 128 may be a legacy port such as DisplayPort, HDMI, DVI, VGA, and/or the like. In such embodiments, the switching device 126 may include configuration channel (CC) logic that can place the selected USB Type-C port 106, 110, 114 in an appropriate alternate mode for transmitting video data to the video display device 132.

As with the video interface 128, the downstream facing USB port 130 may be another USB Type-C port, in which case the switching device 126 may simply make an electrical connection between the selected USB hub 108, 112, 116 and the downstream facing USB port 130 and allow the USB Type-C functionality to negotiate a handshake to place the USB Type-C port in an appropriate mode for transmitting USB information to the USB input device 134. In some embodiments, the downstream facing USB port 130 may be a legacy USB port (such as a Type-A port, a Type-B port, a mini-A port, a mini-AB port, and/or the like). In such embodiments, the switching device 126 may include CC logic to place the selected USB Type-C port 106, 110, 114 in an appropriate mode for exchanging USB information with the USB input device 134. The USB information may be exchanged with the USB input device 134 using any USB communication technique, including low speed, full speed, high speed, SuperSpeed, SuperSpeed+, or any other USB communication technique.

In some embodiments, the video display device 132 may be a large format display such as a projector or flat-screen monitor. In some embodiments, the USB input device 134 is a touch-sensitive panel, a gesture recognition device, a mouse, a keyboard, a presentation clicker, or another input device associated with the video display device 132. In some embodiments, the video display device 132 and the USB input device 134 may be combined into a single device, such as a large format touchscreen or an interactive whiteboard. Such devices may be connected via separate legacy video interface 128 and downstream facing USB port 130 adapters, or may be connected via a single USB Type-C receptacle that serves as both the video interface 128 and the downstream facing USB port 130.

As illustrated, the boardroom table system 100 also includes one or more configuration interface devices 104. In illustrated embodiment, may be used simply to configure switching device and thereby decide which USB Type-C port 106, 110, 114 is communicatively coupled to the video interface 128 and the downstream facing USB port 130. In some embodiments, the configuration interface devices 104 could include one or more mechanical switches. In some embodiments, the configuration interface devices 104 could include a general purpose computing device such as a tablet computing device, a smartphone computing device, a laptop computing device, a desktop computing device, and/or the like. In some embodiments, the configuration interface devices 104 could include a special purpose computing device with an ASIC, a microcontroller, and/or the like having a display, a custom housing, and one or more input devices allowing configuration of the system. In some embodiments, the configuration interface devices 104 could include a computing device capable of network communication, and commands may be provided to the configuration interface devices 104 over a network by an application running on another computing device.

In some embodiments, the power supply and distribution system 102 includes a computing device such as an ASIC, a microcontroller, or a general purpose computing device having a USB Power Delivery system policy manager as defined in the Universal Serial Bus Power Delivery Specification incorporated above. In some embodiments, the power supply and distribution system 102 may consider the capabilities and requests across the entire power delivery topology when determining how power should be distributed, as described in commonly owned, co-pending U.S. application Ser. No. 15/004,382, filed Jan. 22, 2016, the entire disclosure of which is hereby incorporated by reference for all purposes. Each of the USB Type-C ports may include a USB Power Delivery policy engine. One type of policy engine is defined in the USB Power Delivery Specification, though in some embodiments of the present disclosure, the policy engine may be enhanced with non-standard functionality. In some embodiments, the policy engines receive instructions from the power supply and distribution system 102 regarding how power should be distributed.

In some embodiments, the power supply and distribution system 102 may be integrated into one of the configuration interface devices 104. In some embodiments, power may be obtained by the power supply and distribution system 102 for delivery to the rest of the boardroom table system 100 from an external source such as a wall wart, power-over-ethernet (PoE), an external battery, and/or some other source of power. The source of external power is optional, as is indicated by the dashed line in the illustration. In some embodiments, the system policy manager of the power supply and distribution system 102 may use USB power delivery negotiation to obtain power from a device 136, 138, 140 connected to one of the USB Type-C ports 106, 110, 114, and distribute that power to the other USB Type-C ports 106, 110, 114, and/or use that power to activate the rest of the boardroom table system 100. In some embodiments, if the video interface 128 and/or the downstream facing USB port 130 are implemented using a USB Type-C port, then the power supply and distribution system 102 may obtain power from a connected video display device 132 or USB input device 134. As understood by one of ordinary skill in the art, the USB Power Delivery Specification explains how such power management may be established via communication over the configuration channel (CC) to configure the connected devices that are connected, and so is not described in detail herein for the sake of brevity.

In some embodiments, instead of the power supply and distribution system 102 being connected via a USB-standard cable to a downstream facing USB port of each USB hub 108, 112, 116, the power supply and distribution system 102 may be connected to a power input of each USB hub 108, 112, 116, and power delivery logic within each USB hub 108, 112, 116 may manage power delivery. In such embodiments, a system policy manager in one or more of the connected devices 136, 138, 140 may be used to control power delivery instead of a system policy manager in the power supply and distribution system 102.

In some embodiments, the network dongles 120, 122, 124 exchange USB-encapsulated network traffic from the USB Type-C ports 106, 110, 114 as USB information. In some embodiments, the USB Type-C ports 106, 110, 114 are configured in an alternate mode that supports network communication in native format, and the network dongles 120, 122, 124 exchange native network information with the USB Type-C ports 106, 110, 114 and merely convert the traffic at the physical layer. FIG. 1 illustrates the network dongles 120, 122, 124 as being communicatively coupled to an Ethernet hub 118, but in some embodiments, the network dongles 120, 122, 124 are connected to a different type of network device including but not limited to an Ethernet switch, an Ethernet router, a wireless bridge, or another type of networking device. In some embodiments, the Ethernet hub 118 could be absent, and the network dongles 120, 122, 124 could be configured to connect directly to a wireless network such as a WiFi network, an LTE network, and/or the like. By incorporating the network dongles 120, 122, 124 into the boardroom table system 100, the system provides power, network connectivity, and large-format presentation functionality to a given device via a single USB Type-C port.

In use, one or more devices 136, 138, 140 may be coupled to the USB Type-C ports 106, 110, 114. The devices 136, 138, 140 would negotiate power delivery with the system policy manager of the power supply and distribution system 102, and may either receive power for charging or transmit power to the boardroom table system 100 to power its components or others of the devices 136, 138, 140. The devices 136, 138, 140 would seamlessly detect connection to a network dongle 120, 122, 124, and could use the associated dongle 120, 122, 124 to connect to a network. The configuration interface devices 104 could then be used to select one of the USB Type-C ports 106, 110, 114, if any, to specify as the presenting device. If, for example, the first USB Type-C port 106 is chosen, the configuration interface devices 104 would instruct the switching device 126 to make the appropriate connection. Upon forming the connection, the device 136 would detect connection of the video display device 132 and the USB input device 134 and would use them to display and navigate its user interface. Thereafter, the configuration interface devices 104 could change the configuration to specify, for example, the Nth USB Type-C port 114 as the presenting device. The configuration interface devices 104 would instruct the switching device 126 to change the connections, the first device 136 would detect a disconnection of the video display device 132 and the USB input device 134, and the new device 140 would detect connection of the video display device 132 and the USB input device 134.

In some embodiments, the switching device 126 may have additional functionality for interpreting/manipulating the video and/or USB data. For example, the switching device 126 may include functionality for scaling video data, and may be configured to provide scaled video received from two or more devices connected to the USB Type-C ports 108, 110, 114 to be presented on a single video display device 132. As another example, the switching device 126 may interpret the input received by the USB input device 134, and may use that input to control the configuration of the boardroom table system 100 as if it came from a configuration interface device 104. In an example embodiment, these features may be combined by the switching device 126 dividing a video output on a touchscreen display into quadrants, and providing video from two or more of the USB Type-C ports 108, 110, 114 in the quadrants. Thereafter, input received by the touchscreen is received by the switching device 126, which detects a touched quadrant. The switching device 126 may then alter the display to present a full-sized version of the video from the touched quadrant.

Figure 2:
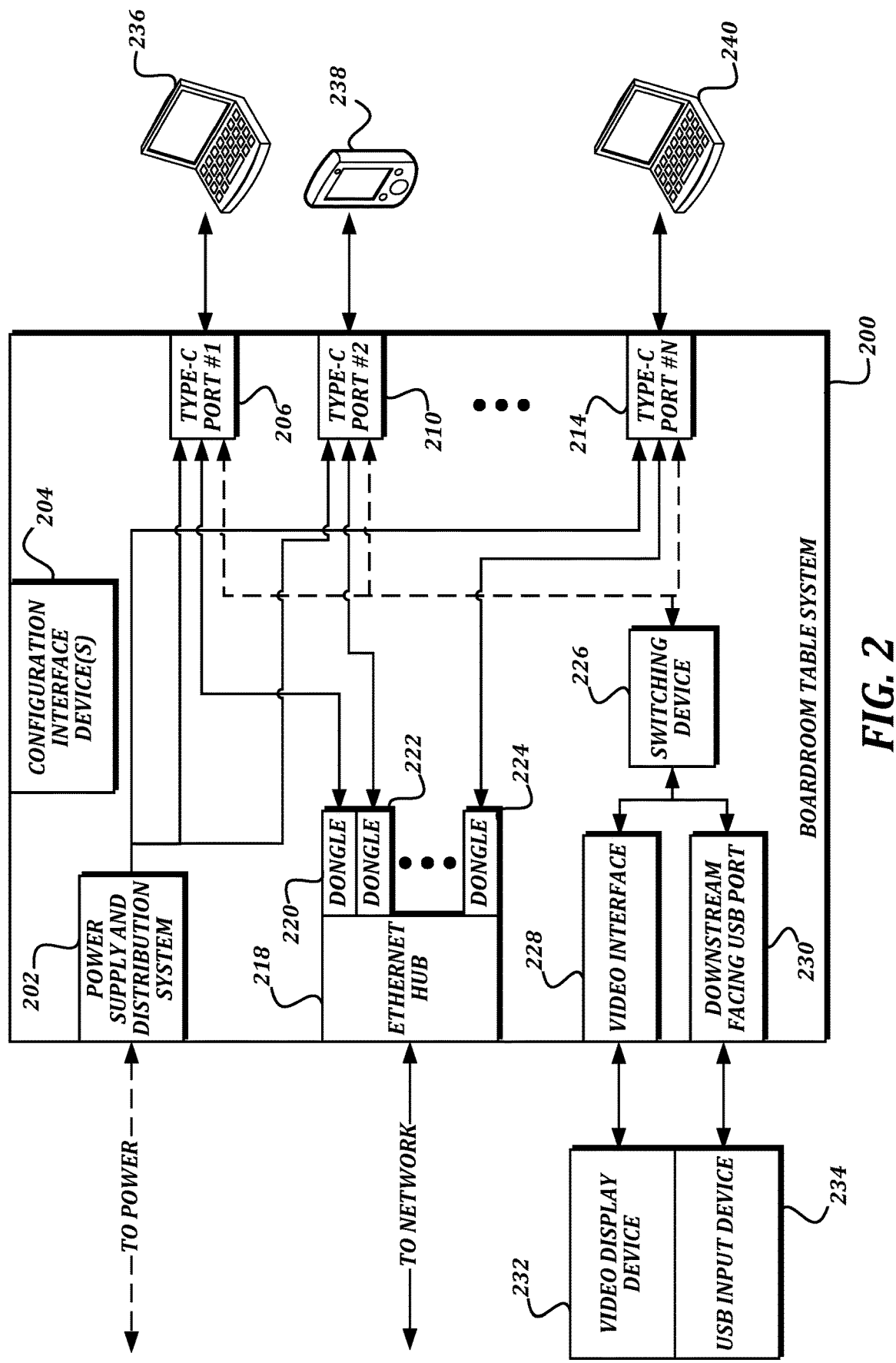
FIG. 2 is a block diagram that illustrates an exemplary embodiment of a boardroom table system according to various aspects of the present disclosure.

FIG. 2 is a block diagram that illustrates an exemplary embodiment of a boardroom table system according to various aspects of the present disclosure. The boardroom table system 200 is similar to the boardroom table system 100 illustrated in FIG. 1, but the USB Type-C ports 206, 210, 214 of the boardroom table system 200 in FIG. 2 are not upstream facing ports of USB hubs. Instead, the conductors of the USB Type-C ports 206, 210, 214 are coupled directly to the power supply and distribution system 202, the network dongles 220, 222, 224, and the switching device 226. Once connected, the devices 236, 238, 240 can negotiate power delivery with the power supply and distribution system 202, and detect the capabilities of the connected network dongles 220, 222, 224, the video display device 232, and the USB input device 234 (if connected by the switching device 226) using USB-standard techniques. If the video interface 228 and downstream facing USB port 230 are not provided via a USB Type-C receptacle, the switching device 226 may include active circuitry that allows the USB Type-C configuration handshake to occur such that the devices 236, 238, 240 transmit the expected signals over the expected conductors. Other details of the operation of the boardroom table system 200 are similar to those in the boardroom table system 100 illustrated in FIG. 1, and so are not repeated here for the sake of brevity.

The embodiments described above are functional and provide benefits over existing systems, but can also be further improved. For example, limitations of standard communication protocol lengths (such as limits on USB cable length and DisplayPort cable lengths outlined in the respective defining specifications) limit the size of a table that can be equipped with the boardroom table systems described above, particularly if the USB Type-C ports are arranged around the periphery of the table. FIGS. 3A-3D are block diagrams that illustrate an exemplary embodiment of a boardroom table system according to various aspects of the present disclosure that addresses the limits on cable length. The embodiments illustrated in FIGS. 3A-3D include seamless protocol extension technology that allows greater distances between the USB Type-C ports and the devices to which they are coupled, thereby allowing larger tables to be supported. As an explanatory note, FIGS. 3A-3D all illustrate the same embodiments of a boardroom table system, but each diagram only illustrates some of the components in order to allow the illustrations to remain clear. One of ordinary skill in the art will recognize that the features illustrated and described in respect to FIGS. 3A-3D can be combined into a single embodiment of a boardroom table system.

Figure 3A:
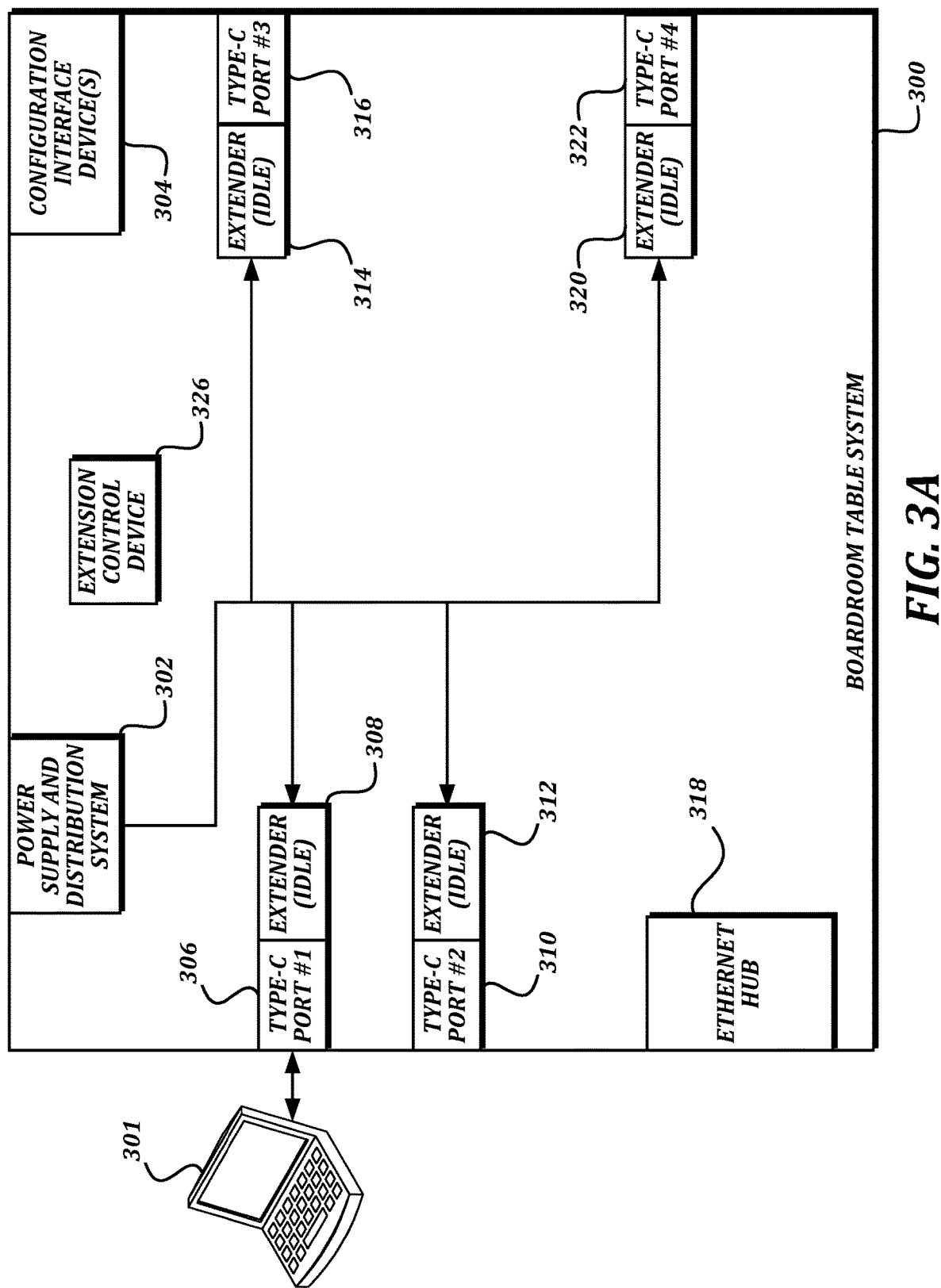
FIGS. 3A-3D are block diagrams that illustrate an exemplary embodiment of a boardroom table system according to various aspects of the present disclosure that addresses limits on cable length.

Turning to FIG. 3A, each of the USB Type-C ports 306, 310, 316, 322 are associated with extender devices 308, 312, 314, 320, respectively. Extender devices 308, 312, 314, 320 are connected to each other via an extension medium such as Ethernet, fiber optic cabling, and/or the like. The extension medium is not illustrated for the sake of clarity, but it allows the extender devices 308, 312, 314, 320 to be selectively paired with each other for communication at distances that may be greater than a distance defined in a USB or video communication standard. As illustrated, the power supply and distribution system 302 may manage power delivery through the USB Type-C ports 306, 310, 316, 322 through the extender devices 308, 312, 314, 320. The delivery of power through the extender devices 308, 312, 314, 320 may occur over the extension medium, or may be via a separate power cable or network. Suitable techniques for managing power delivery via extender devices and over an extension medium are described in commonly owned, co-pending U.S. application Ser. No. 15/004,382, filed Jan. 22, 2016, the entire disclosure of which was incorporated above by reference for all purposes. The power supply and distribution system 302 may act as a power delivery system management device as described in the incorporated disclosure.

In some embodiments, the power supply and distribution system 302 may be coupled directly to the USB Type-C ports 306, 310, 316, 322 without going through extender devices 308, 312, 314, 320, and extender devices 308, 312, 314, 320 may be powered separately by the power supply and distribution system 302 or by other devices as part of the USB Power Delivery topology. If coupled directly to the USB Type-C ports 306, 310, 316, 322, the power supply and distribution system 302 may operate in a manner similar to the power supply and distribution system 102 illustrated and described above.

The boardroom table system 300 also includes an extension control device 326. The extension control device 326 communicates via the extension medium to control configurations of the extender devices 308, 312, 314, 320, and to control pairings between the extender devices 308, 312, 314, 320 in order to reconfigure the USB Type-C port functionality and connectivity. The extender devices 308, 312, 314, 320 are illustrated in FIG. 3A as "idle" because they are illustrated in an unpaired state, as discussed further below.

Figure 3B:
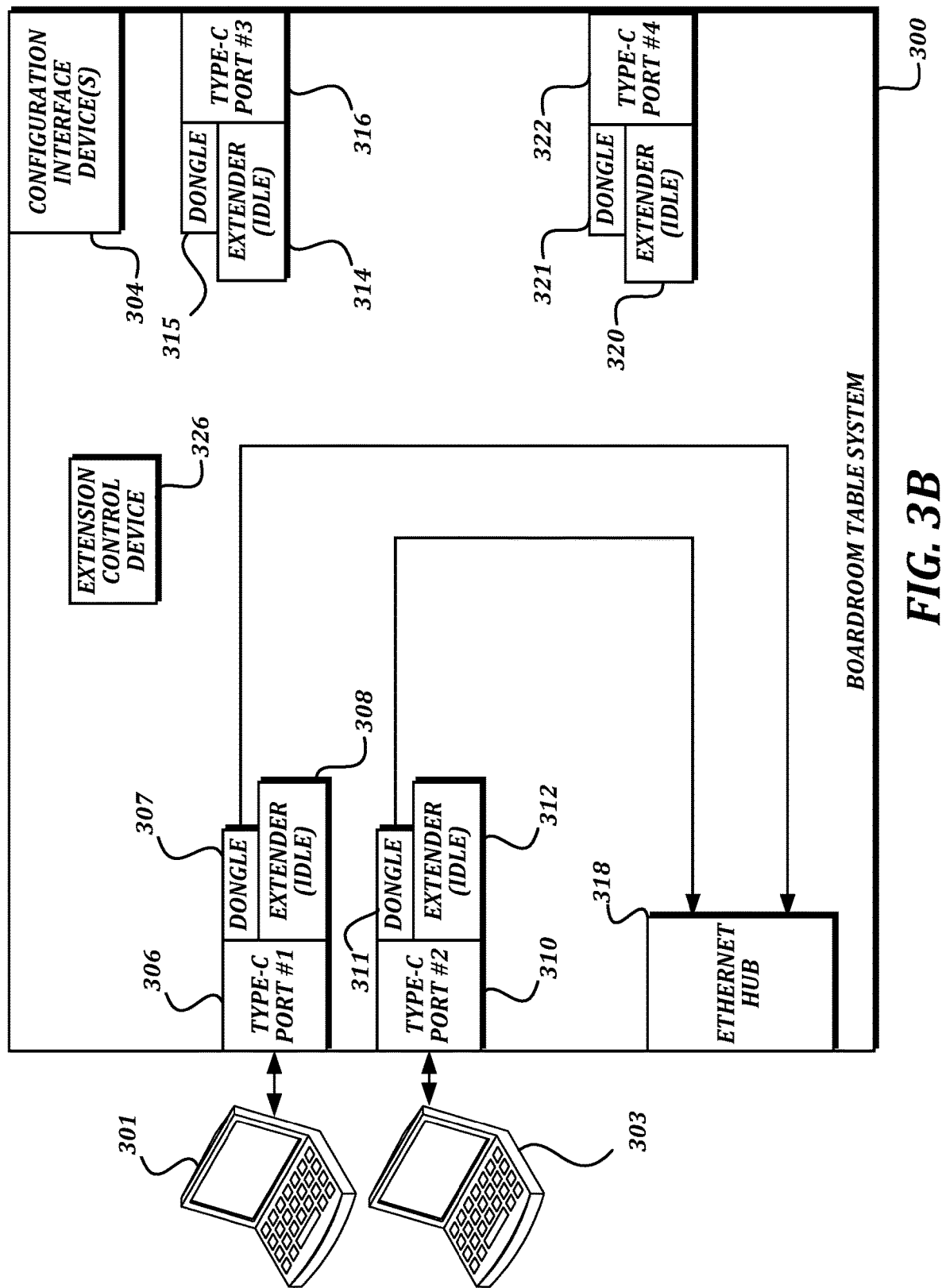

FIG. 3B illustrates connections between the USB Type-C ports 306, 310 and the Ethernet hub 318 to provide network access for devices connected to the USB Type-C ports 306, 310. As with the previously illustrated embodiments, though an Ethernet hub 318 is illustrated, a different type of network device may be used including but not limited to an Ethernet switch, an Ethernet router, a wireless bridge, or another type of networking device. Unlike the previously illustrated embodiments, the network dongles 307, 311, 315, 321 are either integrated into an ASIC or microcontroller that is providing the USB Type-C port functionality, or into an ASIC or microcontroller that is providing the extender device functionality, instead of being a separate device. Hence, no additional connection needs to be made between the USB Type-C ports and the network dongles. This can be particularly useful in embodiments where Ethernet is used as the extension medium for connecting the extension devices 308, 312, 316, 322, because no protocol conversion would be needed if the extension medium is connected to the Ethernet hub as well. Other embodiments could use network dongles as illustrated above in the previously described embodiments.

Figure 3C:
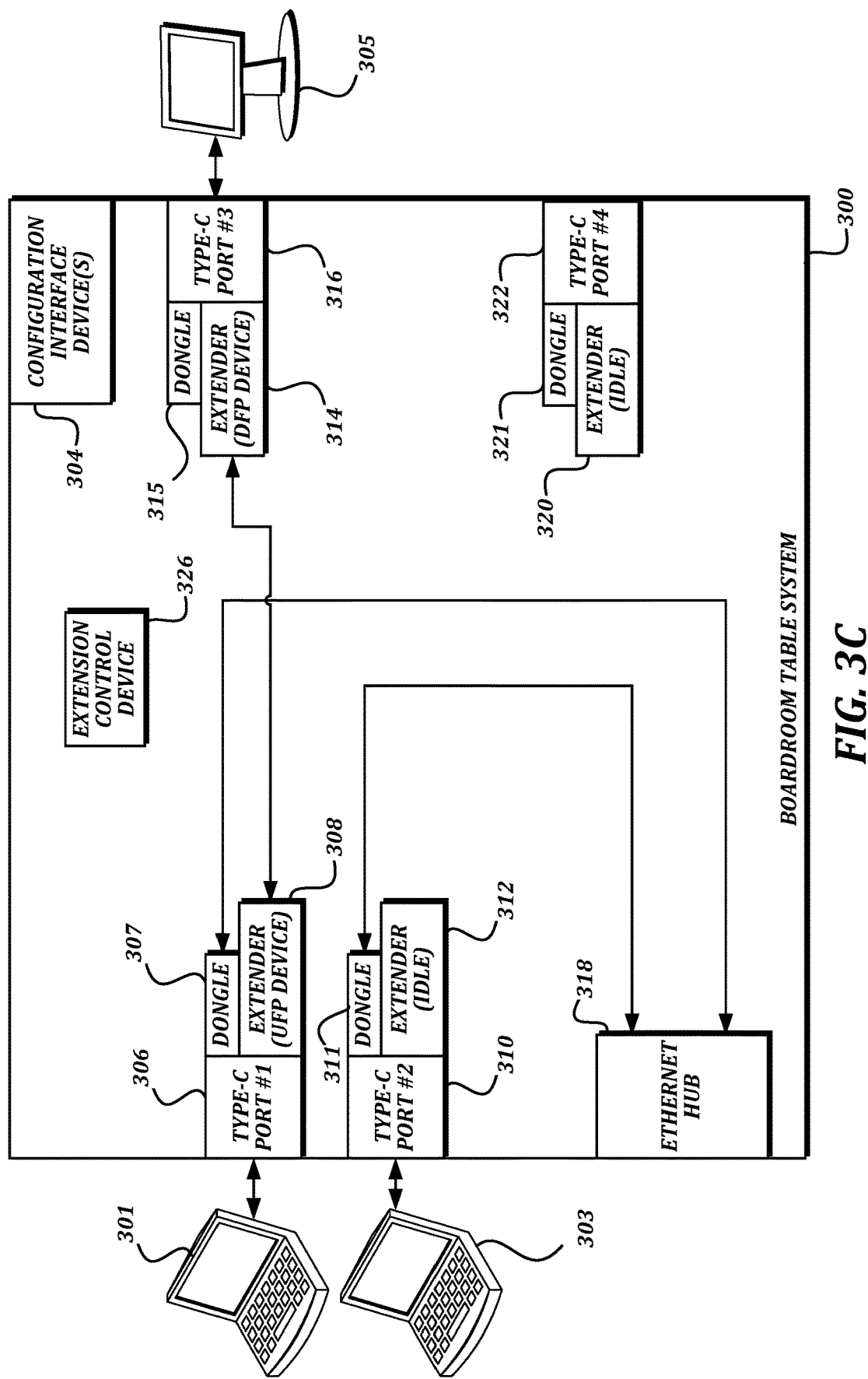

FIG. 3C illustrates connection of a display and configuration of system 300 accordingly to use the display. One benefit of coupling the USB Type-C ports 306, 310, 316, 322 with extender devices 308, 312, 314, 320 via an extension medium is that the USB Type-C ports 306, 310, 316, 322 do not need to be permanently configured for any particular purpose. For example, while the embodiments illustrated and described above used a dedicated video interface 128 and downstream facing USB port 130 coupled to a switching device 126, some embodiments of the boardroom table system 300 allow any of the USB Type-C ports 306, 310, 316, 322 to be configured as the video interface. This can be useful in many situations, including but not limited to providing a table that could be repositioned or rotated within a conference room without having to orient the table to ensure that a dedicated video port is appropriately positioned for display. Instead, whichever USB Type-C port is closest to the ideal position may be configured to have the presentation display attached. This may be particularly useful in embodiments wherein the USB Type-C ports are located near the periphery of the table.

To establish the configuration illustrated in FIG. 3C, the configuration interface devices 304 (which are similar to the configuration interface devices 104, 204 illustrated and discussed previously) receive an input indicating that USB Type-C Port Three 316 should be used for the presentation display, and that USB Type-C Port One 306 should be connected to the display. The instruction is provided to the extension control device 326, which is an ASIC, a microcontroller, or other suitable computing device capable of transmitting instructions to the extender devices 308, 312, 314, 320 via the extension medium. An instruction is sent by the extension control device 326 to extender device 308 to be configured as an upstream facing port device (UFP device) for the extended transmission of video information via the extension medium, and an instruction is sent by the extension control device 326 to extender device 314 to be configured as a downstream facing port device (DFP device) for the extended transmission of video information via the extension medium. Instructions are also sent by the extension control device 326 to extender device 308 and extender device 314 to pair with each other, using network identifiers of the extender devices such as IP addresses, MAC addresses, or other suitable network identifiers.

Once configured as a UFP device and a DFP device and paired with each other, the extender devices 308, 314 allow transparent video communication between the device 301 and the presentation display 305 as if the presentation display 305 was connected directly to the device 301. The device 303 coupled to USB Type-C Port Two 310, which has an extender device 312 that remains in an idle state, will still be able to communicate with the network via the network dongle 311 and to transmit/receive power via the USB Type-C port 310, but will not communicate with the presentation device 305. Further details regarding selectively pairing extension devices over a network are available in commonly owned, co-pending U.S. patent application Ser. No. 13/791,579, filed Mar. 8, 2013, the entire disclosure of which is hereby incorporated by reference for all purposes. To transmit the video information via the extension medium, the extender devices may use any suitable technique, including but not limited to encapsulating the video information in network packets such as IP packets; compression; compression and encapsulation; combining multiple DisplayPort lanes into a single compressed packetized data stream before recovering the DisplayPort lanes on the far side of the extension medium, (including similar techniques for HDMI and DVI); using high-speed SERDES devices; and/or the like. Some particular techniques for transmitting video information via an extension medium are described in commonly owned U.S. Pat. No. 8,549,197, issued Oct. 1, 2013, and U.S. Pat. No. 8,566,482, issued Oct. 22, 2013, the entire disclosures of which are hereby incorporated by reference herein for all purposes. In some embodiments, USB information may be transmitted using the extension devices, while video information is separately transmitted without requiring extension technology via either a switching device as described above, or via a mesh network that is configured by the extension control device 326 to allow the same level of configurability as the extension topology discussed above.

Figure 3D:
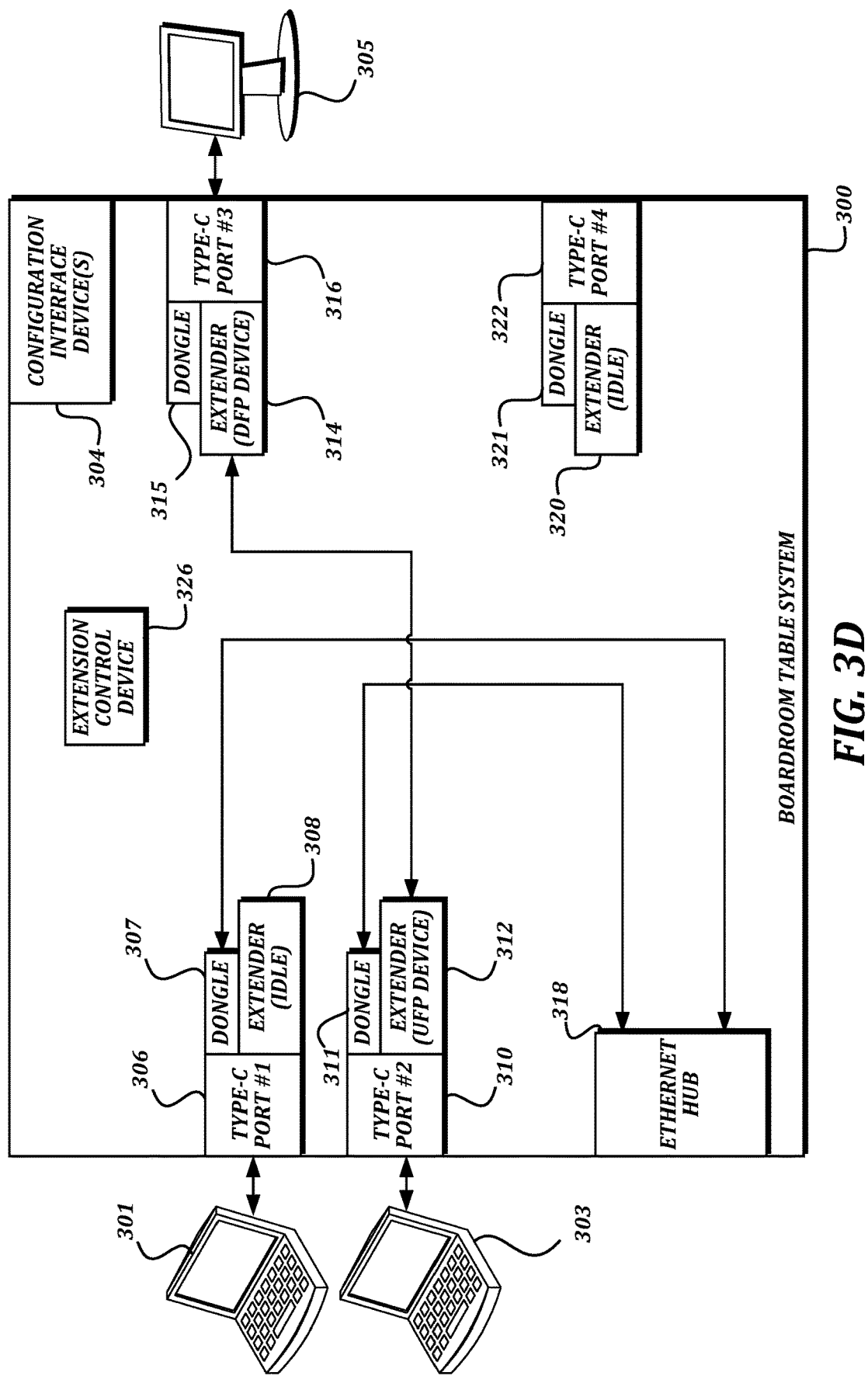

FIG. 3D shows a typical reconfiguration of the boardroom table system 300 illustrated above. In FIG. 3D, the device 303 coupled to USB Type-C Port Two 310 is now configured to present video via the presentation device 305. To accomplish this, an instruction to change the video enabled port is received by the configuration interface devices 304. The extension control device 326 then transmits an instruction to the extender devices 308, 314 to drop their pairing with each other. The extension control device 326 may also transmit an instruction to the extender device 308 of USB Type-C Port One 306 to enter an idle state. The extension control device 326 transmits an instruction to the extender device 312 to operate as a UFP device, and then transmits instructions to the extender device 312 and the extender device 314 to pair with each other. Once the pairing is established, the device 303 will be able to detect and exchange video information with the presentation device 305 as discussed above.

Figure 4:
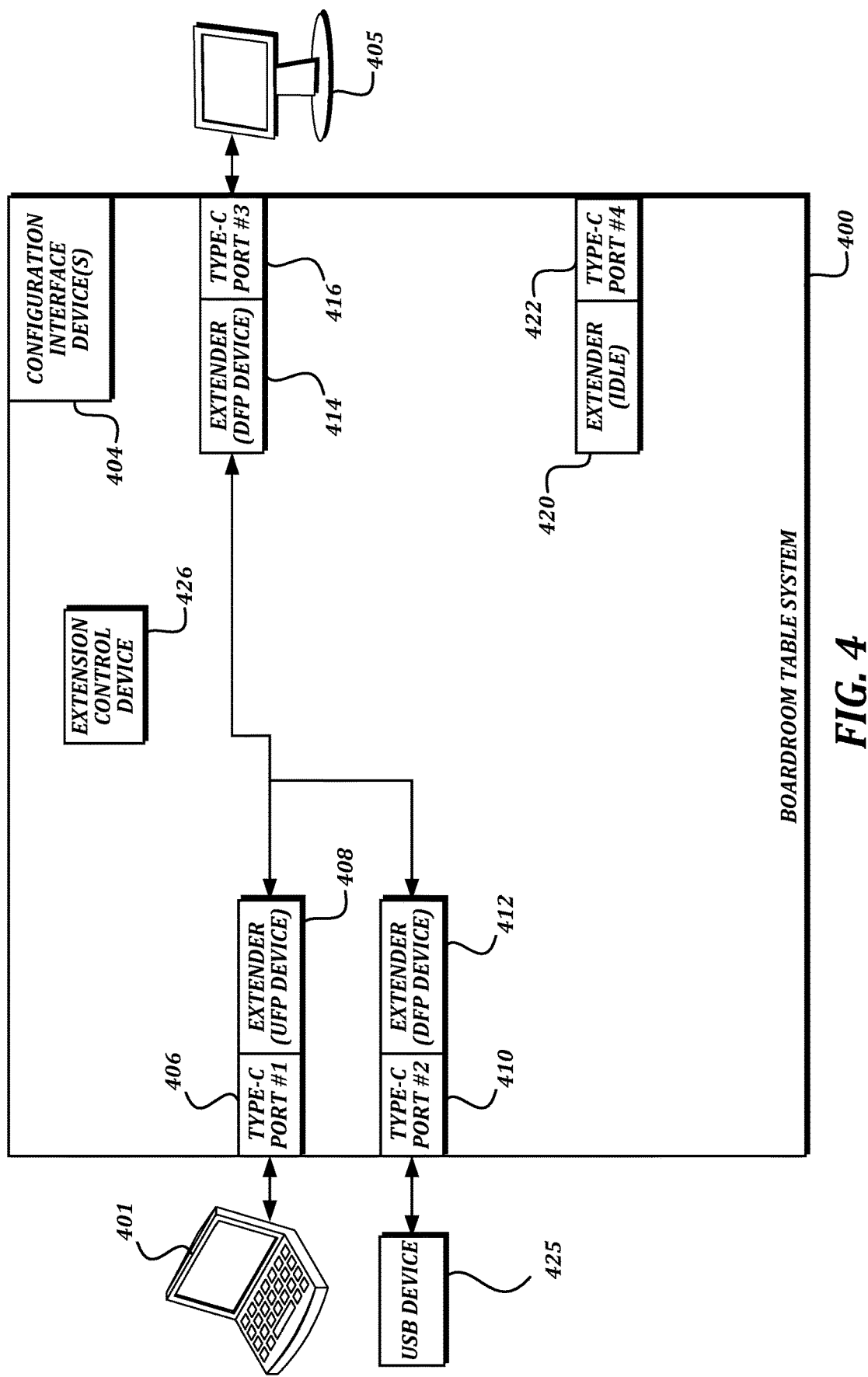
FIG. 4 is a block diagram that illustrates an embodiment of a boardroom table system according to various aspects of the present disclosure.

FIG. 4 is a block diagram that illustrates an embodiment of a boardroom table system according to various aspects of the present disclosure. The boardroom table system 400 may be the same or a similar embodiment as that illustrated in FIG. 3C, in that the extender device 408 of USB Type-C Port One 406 is paired with the extender device 414 of USB Type-C Port Three 416 for video presentation. However, the embodiment of the boardroom table system 400 illustrated in FIG. 4 also shows that the extender device 408 may be paired with more than one DFP device at once. As shown, the configuration interface devices 404 received an instruction to create an additional pairing between the extender device 408 and extender device 412 for the exchange of USB information via the extension medium. The extension control device 426 then transmitted an instruction to the extender device 412 to operate as a DFP device, and transmitted instructions to cause the extender device 408 and the extender device 412 to pair with each other. The extender device 408 may also cause capabilities to be renegotiated between USB Type-C Port One 406 and the device 401, if the device 401 was not previously configured to exchange USB information via USB Type-C Port One 406.

By doing this, device 401 can now communicate with a USB device 425 coupled to USB Type-C Port Two 410, such as a USB storage device, a USB input device, or any other type of USB device. The extension devices 408, 412 are configured to compensate for any timing delays introduced by the extension medium, and so the USB communication between the device 401 and the USB device 425 is as seamless as if the USB device 425 were connected to the device 401 via an entirely USB-compliant physical layer. In some embodiments, separate pairings may be used for the transmission of video data and the transmission of USB data. Accordingly, though only a presentation device 405 is shown, similar techniques may be used to pair the extender 408 to the extender 414 for USB communication to allow communication with a USB input device that is also coupled to USB Type-C Port Three 416.

Further details of techniques for how the extension devices 408, 412 transmit USB communication via the extension medium are included in commonly owned U.S. Pat. No. 6,381,666, issued Apr. 30, 2002; U.S. Pat. No. 8,788,734, issued Jul. 22, 2014; U.S. Pat. No. 9,047,418, issued Jun. 2, 2015; U.S. Pat. No. 9,129,064, issued Sep. 8, 2015; and commonly owned, co-pending U.S. application Ser. No. 13/791,619, filed Mar. 8, 2013; the entire disclosures of which are hereby incorporated by reference for all purposes.

Figure 5:
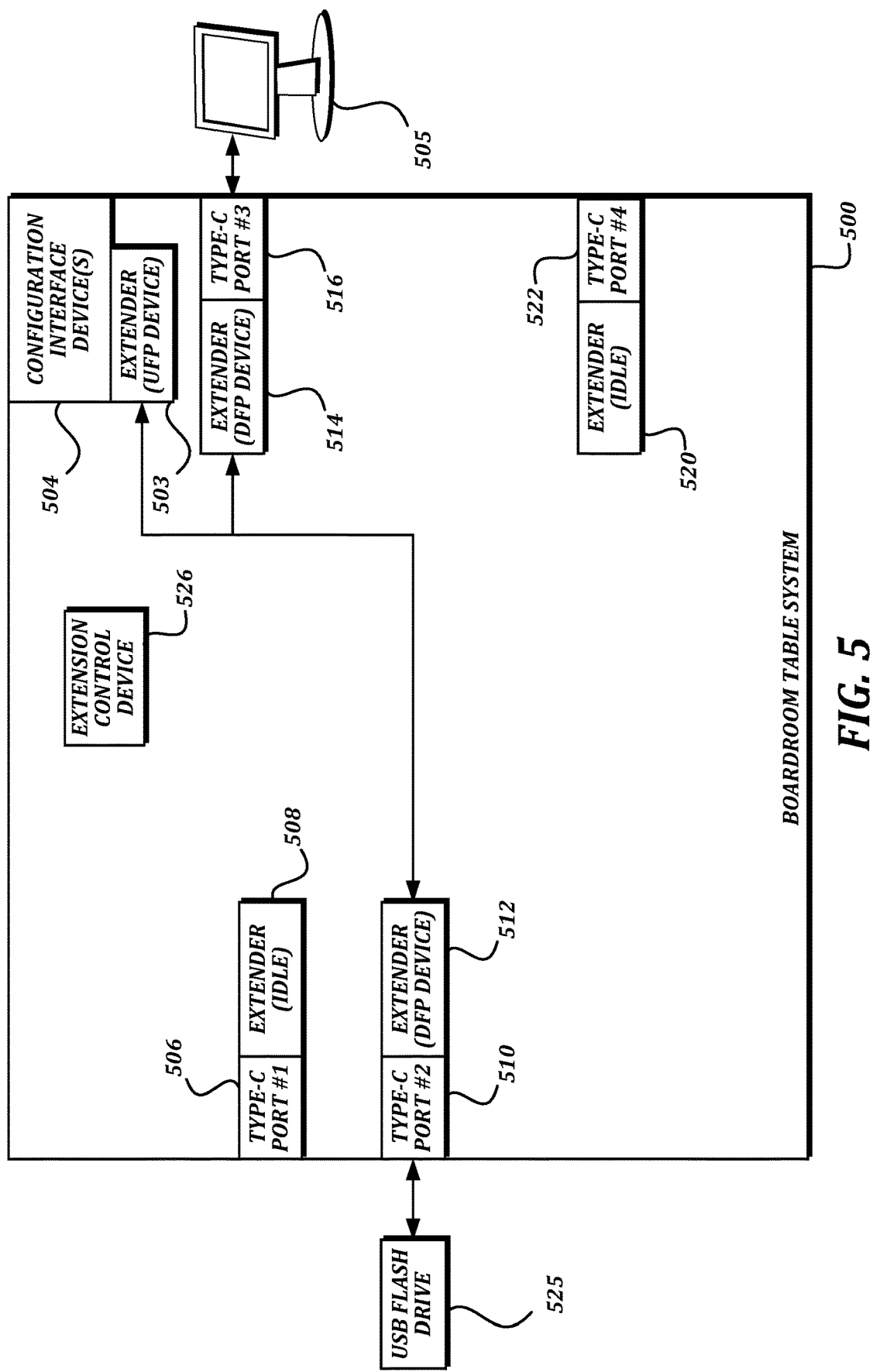
FIG. 5 is a block diagram that illustrates an embodiment of a boardroom table system according to various aspects of the present disclosure.

FIG. 5 is a block diagram that illustrates an embodiment of a boardroom table system according to various aspects of the present disclosure. In the illustrated embodiment of the boardroom table system 500, the configuration interface devices 504 include logic substantial enough to retrieve data from a USB device coupled to a USB Type-C port such as USB Type-C Port Two 510, and to generate and transmit a video presentation based on the data to a presentation device 505 coupled to another port 516. The configuration interface devices 504 may include a laptop computing device, a desktop computing device, a tablet computing device, a custom form factor computing device, or any other suitable computing device. The configuration interface devices 504 are coupled to the rest of the boardroom table system 500 by an extension device 503. In some embodiments, the configuration interface devices 504 may connect to the extension device 503 via a USB Type-C connection, such that functionality of extension device 505 is highly similar to that of the other extension devices discussed above. Basically, this is a special case of the above embodiments, where instead of having all devices removable and connected to the boardroom table system 500 by removable USB Type-C connections, one device or set of devices (the configuration interface devices 504) is built into the table to provide presentation capabilities even if only a USB storage device 525 is available.

Unless explicitly described otherwise, embodiments of the boardroom table systems described above could be integrated into a table, using hidden cable runs, layered construction, pop-up connectors or hubs, recessed connectors or hubs with access panels, covered or uncovered troughs, or the like. All embodiments could alternatively be packaged as an add-on to an existing table, wherein the electronic and cabling components would be attached to an existing table using fasteners such as screws, adhesives, clips, nails, and/or the like.

While illustrative embodiments have been illustrated and described, it will be appreciated that various changes can be made therein without departing from the spirit and scope of the invention. For example, while the above embodiments may be illustrated with a given number of USB Type-C ports, some embodiments may include more or fewer ports.

The embodiments of the invention in which an exclusive property or privilege is claimed are defined as follows:

1. A method of selectively coupling USB Type-C ports of a plurality of USB Type-C ports to a USB downstream facing port, wherein each USB Type-C port is an upstream facing port of a USB hub, wherein a first downstream facing port of each USB hub is coupled to a switching device, and wherein a second downstream facing port of each USB hub is coupled to a network dongle, the method comprising:
   receiving, by the switching device from an interface device, a signal that indicates a first USB Type-C port of the plurality of USB Type-C ports to be coupled to the USB downstream facing port; and
   coupling, by the switching device, the first downstream facing port of a USB hub associated with the first USB Type-C port to the USB downstream facing port.

2. The method of claim 1, wherein the USB downstream facing port is a USB Type-C port.

3. The method of claim 1, further comprising:
   receiving, by the switching device from an interface device, a signal that indicates a second USB Type-C port of the plurality of USB Type-C ports to be coupled to a video interface; and
   coupling, by the switching device, the first downstream facing port of a USB hub associated with the second USB Type-C port to the video interface.

4. The method of claim 1, wherein the USB Type-C ports are coupled to a power supply and distribution system.

5. The method of claim 4, further comprising causing, by the power supply and distribution system, power to be provided from a wall power source or a battery to each of the USB Type-C ports.

6. The method of claim 4, further comprising causing, by the power supply and distribution system, power to be delivered from a device coupled to one of the USB Type-C ports to one or more of the other USB Type-C ports.

7. An extension control device configured to selectively pair USB Type-C ports of a plurality of USB Type-C ports integrated with a table, wherein each USB Type-C port is associated with an extension device of a plurality of extension devices coupled to an extension medium, by performing actions comprising:
   transmitting, by the extension control device, an instruction to a first extension device of the plurality of extension devices to operate as an upstream facing port device (UFP device);
   transmitting, by the extension control device, an instruction to a second extension device of the plurality of extension devices to operate as a downstream facing port device (DFP device); and
   transmitting, by the extension control device, instructions to the first extension device and the second extension device to pair with each other, such that a device coupled to a first USB Type-C port associated with the first extension device can communicate with a device coupled to a second USB Type-C port associated with the second extension device.

8. The extension control device of claim 7, wherein the actions further comprise transmitting, by the extension control device, configuration instructions to the first extension device and the second extension device, wherein the configuration instructions include types of signals to be communicated via particular pins of the associated USB Type-C ports.

9. The extension control device of claim 7, wherein the actions further comprise:
   transmitting, by the extension control device, an instruction to a third extension device of the plurality of extension devices to operate as a UFP device;
   transmitting, by the extension control device, an instruction to the second extension device to remove its pairing with the first extension device; and
   transmitting, by the extension control device, instructions to the second extension device and the third extension device to pair with each other, such that a device coupled to the first USB Type-C port associated with the first extension device can communicate with a device coupled to a third USB Type-C port associated with the third extension device.

10. The extension control device of claim 7, wherein the actions further comprise:
    transmitting, by the extension control device, an instruction to a fourth extension device of the plurality of extension devices to operate as a DFP device; and
    transmitting, by the extension control device, instructions to the first extension device and the fourth extension device to pair with each other.

11. A switching device for selectively coupling USB Type-C ports of a plurality of USB Type-C ports to one or more downstream facing ports, wherein each USB Type-C port is an upstream facing port of a USB hub, wherein a first downstream facing port of each USB hub is coupled to the switching device, wherein a second downstream facing port of each USB hub is coupled to a network dongle, and wherein the switching device is configured to:
    receive, by the switching device, a signal that indicates a first USB Type-C port of the plurality of USB Type-C ports to be coupled to a downstream facing USB port; and
    couple, by the switching device, the first downstream facing port of a USB hub associated with the first USB Type-C port to the downstream facing USB port.

12. The switching device of claim 11, wherein the downstream facing USB port is a USB Type-C port.

13. The switching device of claim 11, further configured to:

receive, by the switching device, a signal that indicates a second USB Type-C port of the plurality of USB Type-C ports to be coupled to a video interface; and couple, by the switching device, the first downstream facing port of a USB hub associated with the second USB Type-C port to the video interface.

14. The switching device of claim 13, wherein the video interface is a USB Type-C port, a DisplayPort port, an HDMI port, a DVI port, or a VGA port.

* * * * *